United States Patent [19]
Sato et al.

[11] Patent Number: 5,906,842
[45] Date of Patent: May 25, 1999

[54] DIET FOR STABILIZING HIGH MILK YIELD OF DAIRY COW AND FEEDING METHOD FOR OBTAINING STABLE HIGH MILK YIELD

[75] Inventors: Hiroyuki Sato; Takeshi Fujieda, both of Kawasaki, Japan

[73] Assignee: Ajinomoto Co., Inc., Tokyo, Japan

[21] Appl. No.: 08/698,226

[22] Filed: Aug. 14, 1996

Related U.S. Application Data

[63] Continuation of application No. 08/194,347, Feb. 8, 1994, abandoned.

[30] Foreign Application Priority Data

Feb. 12, 1993 [JP] Japan .................................. 5-024256

[51] Int. Cl.⁶ ...................................................... A01K 1/00
[52] U.S. Cl. .............................. 426/2; 424/438; 424/442; 426/534; 426/623; 426/648
[58] Field of Search ................................ 426/2, 534, 623, 426/648; 424/438, 442

[56] References Cited

U.S. PATENT DOCUMENTS

| | | | |
|---|---|---|---|
| 4,016,294 | 4/1977 | Glabe et al. | 426/534 |
| 4,450,176 | 5/1984 | Stahel | 426/2 |
| 5,066,498 | 11/1991 | McCauley | 426/2 |
| 5,219,596 | 6/1993 | Smith et al. | 426/2 |
| 5,225,218 | 7/1993 | Robert | 426/2 |
| 5,227,166 | 7/1993 | Ueda et al. | |
| 5,300,297 | 4/1994 | Ueda et al. | |

OTHER PUBLICATIONS

Canale et al, *J. Dairy Sci.*, vol. 73, pp. 135–141 (1990).
Polan et al, *J. Dairy Sci.*, vol. 74, pp. 2997–3013 (1991).
Robinson et al, *J. Dairy Sci.*, vol. 75, pp. 199 (1992) Abstract p. 162.
*Patent Abstracts of Japan*, vol. 15, No. 68 (C–0807), (1990) Abstract.
Rogers et al, *J. Dairy Sci.*, vol. 72, pp. 1800–1817 (1989).
Donkin et al, *J. Dairy Sci.*, vol. 72, pp. 1484–1491 (1989).
Chow et al, *J. Dairy Sci.*, vol. 73, pp. 1051–1061 (1990).
Rogers et al, *J. Dairy Sci.*, vol. 70, pp. 789–798 (1987).
Guillaume et al, *J. Dairy Sci.*, vol. 74, pp. 1912–1922 (1991).

*Primary Examiner*—John J. Gallagher
*Attorney, Agent, or Firm*—Oblon, Spivak, McClelland, Maier & Neustadt, P.C.

[57] ABSTRACT

A corn-based mixed diet comprises rumen-protected lysine, rumen-protected methionine and an appetizer preferred by the dairy cows, which makes it possible to obtain a stable and high milk production from dairy cows. A method for stably producing a high yield of milk comprises the step of feeding to dairy cows in the course of the lactation period (1) a corn-based mixed diet containing rumen-protected lysine, rumen-protected methionine, an appetizer preferred by the dairy cows and a corn-based diet or (2) rumen-protected lysine, rumen-protected methionine and a corn-based diet, an appetizer being contained in one member selected from the group consisting of the rumen-protected lysine, rumen-protected methionine and corn-based diet.

14 Claims, 1 Drawing Sheet

5,906,842

DIET FOR STABILIZING HIGH MILK YIELD OF DAIRY COW AND FEEDING METHOD FOR OBTAINING STABLE HIGH MILK YIELD

This application is a continuation of application Ser. No. 08/194,347, filed on Feb. 8, 1994, now abandoned.

BACKGROUND OF THE INVENTION

The present invention relates to a corn-based mixed diet comprising rumen-protected lysine (hereinafter referred to as "RPLys"), rumen-protected methionine (hereinafter referred to as "RPMet") and appetizer having a flavor which meets the dairy cow's taste, and a feeding method for dairy cows with the diet.

Investigations have been made hitherto for the purpose of improving the dairy cow breed and developing diets for the dairy cows in order to increase the milk production and to improve the milk qualities such as proteins and fats contained in the milk. As a result, high-yielding dairy cows capable of producing 7500 kg or more of milk a year and, particularly, those capable of producing 10,000 kg or more of milk a year were bred. Protein balance attracted attention in increasing the milk production and keeping good health of dairy cows, and after investigations of them, American NRC standard was established. In order to keep the milk production stable while keeping a high quality thereof, various nutritive substances and at least one of protein sources such as grains, fish meal and blood meal are incorporated as additives for grass into the dairy cows diet. However, such protein sources do not always meet the dairy cows' taste and the intake of such additives poses a problem of a load in the metabolism of the diary cows. Thus the administration of protein by feeding easily available protein sources is not always helpful to the efficient milk production.

Investigations were made for the purpose of direct administration of the amino acids constituting the protein under these circumstances. However, when the amino acids are directly mixed in the diet and given to the dairy cows, most of them are degraded in the rumen of cows before they reach into the small intestine where they are to be absorbed, and thus the purpose cannot be attained. Thereafter, rumen-protected amino acids (RPAA) were developed, which are prepared by coating the amino acids with a protecting agent so that they are not degraded in the rumen and the amino acids are reached and exposed in the small intestine. In particular, RPMet (rumen-protected methionine), RPLys (rumen-protected lysine) and RPMet & RPLys (rumen-protected methionine and lysine) are known.

As for the causal relation between the milk quality and the amino acids, it was found from the infusion experiments in which the amino acids are directly infused into the small intestine via duodenal cannula that especially methionine and lysine among the amino acids have a close relation to the milk quality. It is known that methionine is effective in improving the fat content in the milk and lysine is effective in improving the protein content in the milk.

J. A. Rogers et al. made experiments in which two kinds of corn-based diets containing both RPMet and RPLys were given to dairy cows to compare the relationships between the diet and the milk production of them with each other (Journal of Dairy Science, Vol. 72, No. 7, 1989). In the experiments, nine levels of RPAA were used, which were prepared by mixing one of three levels (3.4, 7.8 and 12.2 g/d) of RPMet with also one of three levels (5.9, 13.5 and 21.1 g/d) of RPLys. The diets comprised corn silage and corn grains as the bases. One kind of the diets further contained corn gluten meal and urea, and the other contained soybean meal. The former was given to low-yielding dairy cows with a milk production of 7,500 kg or below per year, and the latter was given to high-yielding dairy cows of a milk production of 8,000 kg or above per year. Each of the nine levels of RPAA was added to each of the two kinds of diets. Urea was used as the nitrogen source for the microorganisms which accelerates the digestion of the diet in the rumen. Since urea is degraded in the rumen, it does not reach the small intestine. It is usually said, therefore, that urea has no effect of improving the protein content in the milk, since it is not absorbed in the dairy cow's body. J. A. Rogers et al. reported that neither milk production nor milk protein had been improved by the soybean meal diet in the high-yielding dairy cow groups. Although they reported also that the milk production in the low-yielding group to which the corn gluten diet had been given was increased by 3%, the yield was yet below the level of the high, stable milk production.

On the other hand, Sato et al. reported at International Dairy Congress in October, 1990 that the fat content of the milk had been improved by giving a corn-based diet containing RPLys and RPMet to dairy cows. However, they were silent on the method of feeding dairy cows for increasing further the milk production of the high-yielding dairy cows evenly and steadily. Also, they did not disclose the incorporation of the appetizer into the corn-based mixed diet.

As for the milk production of the high-yielding dairy cows in the course of feeding them, it varies depending on the difference in individual cows at present and, therefore, it is impossible for the dairy farmers to accurately estimate the milk production per year at the start of feeding the high-yielding dairy cows, which is a cause for the instability of the management of the dairy farmers. Under these circumstances, it is demanded to develop methods for the stable feeding of high-yielding dairy cows and also for the high milk production by eliminating the individual difference of the cows so that the milk production per year can be accurately estimated from the number of the cows.

SUMMARY OF THE INVENTION

A primary object of the present invention is to provide a diet for obtaining a stable, high milk production from dairy cows by giving a corn-based mixed diet containing RPLys and RPMet to the cows.

Another object of the present invention is to provide a feeding method for obtaining a stable and high milk production.

These and other objects of the present invention will be apparent from the following description and examples.

The present invention has been completed on the basis of the finding that the above-described problems can be efficiently solved by giving a corn-based mixed diet containing both rumen-protected lysine and rumen-protected methionine and an appetizer preferred by the dairy cows.

Namely, the present invention provides a corn-based mixed diet, which comprises rumen-protected lysine, rumen-protected methionine and an appetizer preferred by the dairy cows.

The present invention provides also a method for stably producing a high yield of milk which comprises the step of feeding to dairy cows in the course of the lactation period (1) a corn-based mixed diet containing rumen-protected lysine, rumen-protected methionine, an appetizer preferred by the dairy cows and a corn-based diet or (2) rumen-protected lysine, rumen-protected methionine and a corn-based diet, an appetizer being contained in one member selected from the group consisting of the rumen-protected lysine, rumen-protected methionine and corn-based diet.

DESCRIPTION OF THE PREFERRED EMBODIMENTS

It is surprising that when the corn-based mixed diet containing an effective, minimum amount of RPAA indispensable for the milk production and an appetizer is given to dairy cows in the course of the lactation, the milk production of not only low-yielding dairy cows but also high-yielding dairy cows is increased and, in addition, the individual difference of the cows is reduced to make the milk production of each cow even. It is surprising that the milk production per year of high-yielding dairy cows can be further increased by as high as 5.1% according to the present invention, though the milk production of them has been already as high as 7,500 kg per year which has been considered to be almost the higher physical limit for the dairy cows at present.

As RPLys and RPMet used in the present invention, known rumen-protected amino acids (hereinafter referred to as "RPAA") can be used. The amino acid may be a mixture of predetermined amounts of rumen-protected amino acids or a mixture prepared by mixing predetermined amounts of lysine and methionine and protecting the mixed amino acids. The amino acids can be protected by a spray-drying method or kneading method wherein a coating agent comprising a polymeric main component, fatty acid, oil or fat, hardened oil or fat, wax and, if necessary, a surfactant, inorganic salt, polysaccharide, saccharose ester and so forth is used. RPAA thus prepared can be used as it is. Various RPAA products disclosed in the following specifications are usable: Japanese Patent Unexamined Published Application (hereinafter referred to as "J.P. KOKAI") Nos. Sho 59-66842, Sho 63-181953, U.S. Pat. No. 4,842,863, and J.P. KOKAI Nos. Sho 58-175449, Sho 56-154956, Sho 63-317053, Sho 60-168351, Sho 59-198946, Hei 02-027950, Hei 02-128654, Hei 02-128655, Hei 03-058755, Hei 03-155756, Hei 03-155757, Hei 04-079844 and Hei 05-023114, and U.S. Pat. No. 4,797,288.

The amount of the rumen-protected lysine and rumen-protected methionine is 0.01 to 1% by weight, preferably 0.02 to 0.2% by weight, based on the whole mixed diet. The weight ratio of lysine to methionine is 5/1 to 1/1, preferably 5/1 to 3/2.

The appetizer used in the present invention desirably has a taste (flavor) suitable for the dairy cows. The flavor preferably lasts for a long period of time, and the appetizer preferably has an excellent storability and is not changed by decomposition or the like. Examples of the appetizers include roasted soybean flour having an aroma but free from the unpleasant smell peculiar to raw soybeans, brewers' grains, rice bran and molasses. Among these, the roasted soybean flour, brewers' grains and rice bran are preferable. Since the corn-based mixed diet used in the present invention contains the appetizer, the diet intake was increased by about 10% when it was given to dairy cows.

The corns of the corn-based mixed diet used in the present invention include corn silage, corn grains and processed or semi-processed products of them. The diet may further contain a soybean product, corn gluten meal, wheat gluten, grass such as timothy hay, lucerne hay, hay cubes and beet pulp, inorganic substances, vitamins and the appetizer. Although the amounts of them are not particularly limited, the diet contains the corns in an amount of usually 30 to 70% by weight, preferably 50 to 70% by weight, and the appetizer in an amount of 0.3 to 4% by weight. The soybean products and glutens are contained in proper amounts, and it is preferred that both of them are contained in the diet. Among the grasses, timothy hay and lucerne hay are consumed mainly as nutritive sources for the microbes in the rumen.

The corn-based mixed diet used in the present invention is free from protein sources disliked by the dairy cows such as fish meal and blood meal. Only limited amino acids are incorporated in the forms of RPLys and RPMet into the diet in which the previously calculated protein requirement lacks in these amino acids. Since the protein intake efficiency of the diet is thus high, the self-metabolism of the dairy cows becomes easy. Another merit is that since the diet contains the appetizer, the diet intake of the dairy cows is increased by about 10%, the difference in individual the cows is eliminated and the cows keep a stable appetite during the whole lactation period. As a result, an increased milk production becomes possible without the individual difference of even the high-yielding dairy cows, though the milk production by them has been considered to have already reached the higher physical limit.

The protein requirement is calculated on the basis of W. G. Bergen's theory disclosed in "Feed Stuff", Dec. 8, 18, (1986). According to his theory, the requirement (A) of amino acids constituting the protein is determined from the total of (1) protein requirement for keeping the body weight (650 kg) of the dairy cow and (2) protein requirement calculated by multiplying proportion of amino acids constituting the milk protein by the yield of milk.

On the other hand, ARC standard is known for the amino acid supply. According to the ARC standard, the diet to be given to the dairy cows contain (1) a bypass protein which passes through the rumen and (2) microbial protein which is decomposed by the microbes in the rumen, then taken into the microbial body and reaches into the small intestine while it is in the microbial body. The total of both protein types is called the net protein. The amount (B) of the amino acids fed for the protein synthesis is calculated by multiplying the coefficient of digestibility of the net protein in the small intestine by the utilization factor.

The difference between (A) and (B) is an index showing the sufficiency or insufficiency of the amino acids. RPAA and the demand thereof were determined by this idea of the index according to the above-described theory in the present invention. An example of setting the dose of RPAA was as follows: The amino acid sufficiency of a cow weighing 650 kg and producing 40 kg/day of milk having protein content of 3.0% by feeding was estimated. The estimated sufficiency was regulated to some extent by the variation of the amino acid content of the materials for the diet, and the quantities of RPLys corresponding to 19.8 g of L-Lys- HCl (15.8 g of L-Lys) and RPMet corresponding to 6.4 g of DL-Met were determined. The amino acid requirement, sufficiencies and the amounts of supplemented RPAA were determined to obtain the results given in Table 5. The amount of supplemented RPAA given to the cows with milk production levels of 25 kg/day, 30 kg/day and 40 kg/day (13 to 24 weeks) was also determined in the same manner as that described above to obtain the results given in Tables 5 to 8. The results indicated that the amounts of methionine and lysine (the amino acids) in the original diet were insufficient for the effective absorption of the protein and that by supplementing them in the form of RPAA, the effective absorption of the protein can be expected.

The method for feeding RPAA is not particularly limited so far as the dairy cows surely intake the whole quantity thereof. RPAA can be previously incorporated into the corn-based mixed diet or, alternatively, it can be sprinkled over the diet so that RPAA can be eaten first. It is also preferred to administer RPAA separately from the diet so that the intake thereof can be confirmed. In such a case, RPAA is given in combination with the appetizer which meets the cows' taste. The mixture of RPAA and the appetizer can be in the form of a powder, semi-paste, aqueous solution or dumpling-shaped solid. Also, a mixture of one or more of the rumen-protected lysine, rumen-protected methionine and corn-based diet with the appetizer can be given. The appetizer may be added to all of the rumen-protected lysine, rumen-protected methionine and corn-based diet. In this connection, there can be used a powder mixture of the appetizer and the rumen-protected lysine, a powder mixture of the appetizer and the rumen-protected methionine, a powder mixture of the appetizer and corn-based diet, granules of the appetizer and the rumen-protected lysine, granules of the appetizer and the rumen-protected methionine, granules of the appetizer and corn-based diet, or the like.

The time period for feeding RPAA to dairy cows is not limited, but RPPA may be fed to dairy cows every day beginnig about 3 weeks prior to the parturition of the dairy cows and continuing the feeding until 308 days after the parturition, preferably every day beginnig about one day prior to the parturition of the dairy cows and continuing the feeding until 308 days after the parturition, more preferably every day beginnig about 35 days after the parturition of the dairy cows and continuing the feeding until 308 days after the parturition.

As for the milk production in the lactation period of the dairy cows, WOOD's lactation curve represented by the following general formula (I):

$$y = at^b e^{-c\,t} \qquad (I)$$

is known. The maximum in the lactation curve is obtained 50 to 80 days after calving. In the above formula, y represents the lactation per day, t represents the number of days after calving, and a, b and c are parameters. The lactation of each dairy cow per year is given in terms of the total lactation in 305 days. Usually the cows with a lactation of 7,500 kg/year or above are called "high-yielding dairy cows" and those of a lower lactation are called "low-yielding dairy cows".

According to the present invention, the lactation of particularly the low-yielding dairy cows is remarkably increased and that of the high-yielding dairy cows is also increased. Further, the difference in individual cows is decreased and, therefore, the lactations of the respective cows can be made even. The lactation per year of the high-yielding cows which produce at least 7,500 kg of the milk per year can be further increased by as high as 5.1%.

The following Examples will further illustrate the present invention.

EXAMPLE 1

All the dairy cows to be subjected to the tests, which were not lactating were collected in Obihiro area in Hokkaido, Japan, and fed for about one month previously to calving for the accommodation to the diet sample. After calving, the cows were classified into groups one by one, and the lactation tests were conducted from 6 weeks to 44 weeks after calving.

The test period was divided into the early lactation period (6 to 17 weeks after the delivery), middle lactation period (18 to 31 weeks after the delivery) and the late lactation period (32 to 44 weeks after the delivery).

(1) Experimental animals:

All the Holstein cows subjected to the experiments were collected in Tokachi and Obihiro areas.

The cows satisfying the following requirements were selected:

1. The cows had passed the cow group examination and had the lactation record.

2. They were high-yielding cows having a total lactation in 305 days of at least 7,500 kg.

3. The average milk fat content in the year was at least 3.5%.

4. The expecting calving number would be the third or fourth one.

5. The expected calving date would be the middle of February to the middle of March.

The report of investigation before the purchase, the herdbook and the examination report of each dairy cow were obtained. When the cows were received, they were inoculated with live IBR vaccine for prevention against infectious bovine nasal tracheitis (IBR) and Levamisole preparation was administered as a parasiticide by percutaneous absorption along the mid dorsal line of each cow for exterminate parasites such as nematodes and pulmonary worms. Table 1 shows the individual numbers, results of the preceding calving, as well as the lactation in the fifth month, calving number and calving date of ten cows (5 cows×2 groups) used in the test of the present invention.

The division of the cows into the two groups was conducted so that the total lactation in the lactation period after the preceding delivery, the quality of the milk, the order of the delivery, the date of the delivery and lactation during the pre-raising period (the fifth week after calving) were as even as possible. The total lactation in the period after the preceding calving was estimated from the WOOD lactation curve on the basis of the results of the cow group examination.

TABLE 1

| | Experimental animals | | | | |
|---|---|---|---|---|---|
| | Results of preceding parturition | | | | |
| | Total milk production in 305 days (estimation from Wood lactation curve) | Milk production peak | Milk composition (average for the year) | | |
| No. | (kg) | (kg/day) | fat (%) | protein (%) | S.N.F (%) |
| Control group | | | | | |
| C-1 | 8343.4 | 40.0 | 3.84 | 3.22 | 8.61 |
| C-2 | 8103.0 | 44.4 | 3.61 | 2.91 | 8.05 |
| C-3 | 7660.8 | 32.7 | 4.01 | 3.20 | 8.83 |
| C-4 | 8211.7 | 34.7 | 3.64 | 2.94 | 8.70 |
| C-5 | 9140.1 | 39.0 | 3.46 | 2.82 | 8.13 |
| Average | 8291.8 | 38.2 | 3.71 | 3.02 | 8.46 |
| S.D. | 539.1 | 4.6 | 0.21 | 0.18 | 0.35 |
| RPAA group | | | | | |
| E-1 | 7885.7 | 42.1 | 3.76 | 3.02 | 8.62 |
| E-2 | 7469.6 | 33.6 | 3.76 | 3.33 | 8.74 |
| E-3 | 8618.6 | 44.7 | 3.77 | 3.60 | 9.33 |
| E-4 | 7420.7 | 42.6 | 3.60 | 2.93 | 8.48 |
| E-5 | 8462.2 | 36.1 | 4.00 | 3.45 | 9.23 |
| Average | 7971.4 | 39.8 | 3.78 | 3.27 | 8.88 |
| S.D. | 552.8 | 4.7 | 0.14 | 0.28 | 0.37 |

| | Test (present invention) | | | |
|---|---|---|---|---|
| No. | Average milk production in the 5th week (kg/day) | Lactation number | Calving date | Date of initiation of test |
| Control group | | | | |
| C-1 | 44.8 | 3 | 2/16 | 3/24 |
| C-2 | 45.6 | 4 | 2/27 | 4/4 |

TABLE 1-continued

| | Experimental animals | | | |
|---|---|---|---|---|
| C-3 | 39.6 | 3 | 3/4 | 4/9 |
| C-4 | 41.0 | 3 | 3/11 | 4/16 |
| C-5 | 43.7 | 4 | 3/14 | 4/19 |
| Average | 42.9 | 3.4 | | |
| S.D. | 2.6 | 0.5 | | |
| RPAA group | | | | |
| E-1 | 45.2 | 3 | 2/24 | 4/1 |
| E-2 | 41.0 | 4 | 3/8 | 4/13 |
| E-3 | 43.8 | 4 | 3/12 | 4/18 |
| E-4 | 42.9 | 4 | 3/15 | 4/20 |
| E-5 | 42.6 | 3 | 3/20 | 4/25 |
| Average | 43.1 | 3.6 | | |
| S.D. | 1.6 | 0.5 | | |

RPLys and RPMet used in the experiment were those prepared by coating lysine and methionine respectively with a 4-vinylpyridine/styrene copolymer. The results of in vitro evaluation of the protective properties and dissolution are given in Table 2.

TABLE 2

In vitro evaluation of RPAA

| Sample | A.A. | A.A. % | Coat (%) | Specific gravity | Particle strength (N) (n = 5) | Protection (%)* | Dissolution rate (%)** 60 min | 120 min | 180 min |
|---|---|---|---|---|---|---|---|---|---|
| (Lys.HCl) | | | | | | | | | |
| A-3 | Lys | 66.4 | 22.6 | 1.12 | 15.8 ± 2.1 | 102.1 | 98.2 | 97.0 | 99.0 |
| A-4 | Lys | 65.7 | 23.4 | 1.09 | 16.9 ± 1.8 | 98.8 | 82.9 | 100.0 | 103.0 |
| A-5 | Lys | 53.0 | 26.1 | 1.10 | 16.3 ± 0.9 | 95.0 | 81.0 | — | 100.0 |
| A-6 | Lys | 53.0 | 26.8 | 1.11 | 18.0 ± 2.1 | 98.0 | 90.0 | — | 100.0 |
| (DL-Met) | | | | | | | | | |
| B-3 | Met | 64.0 | 15.7 | 1.10 | 9.2 ± 0.8 | 101.7 | 77.7 | 98.2 | 99.1 |

*evaluation of protection rate in rumen juice (24 h)
**evaluation of dissolution rate in the abomasum digesta (pH 2.3)

(2) Feeding method:

The above-described RPLys and RPMet were added to the diet given in Table 3 and the resultant mixture was given to the cows in the morning and evening (group E of the present invention). The amounts of dry matter intake by the cows are also given in Table 3. As the control, the same procedure as that of the present invention was repeated except that RPLys and RPMet were not given (control group). The compositions of the mixed diets given in Table 3 are shown in Table 4. The amino acid in the diet and the amounts of RPLys and RPMet added in order to fill up the shortage are given in Tables 5 to 8. 30 g/day (corresponding to 15.7 g/day of Lys) of RPLys and 10 g/day (corresponding to 6.4 g/day of Met) of RPMet were used, and the amounts given in the tables are those of Lys and Met per se. Although lysine was used in the form of its hydrochloride, the amounts thereof given in the tables were those of lysine per se.

TABLE 3

Diet composition

| | Amount of diet (kg/day) | | | | |
|---|---|---|---|---|---|
| | Non-lactation | Lactation (Milk production: kg/day) | | | |
| Material | (Dry period) | 40 | 30 | 25 | 20 |
| Corn silage | 6.0 | 14.0 | 14.0 | 14.0 | 14.0 |
| Timothy hay | 8.0 | 2.0 | 2.0 | 2.5 | 2.5 |
| Lucerne hay | — | 3.0 | 3.0 | 3.5 | 3.5 |
| Hay cube | 2.0 | 2.0 | 2.0 | 2.0 | 2.0 |
| Beet bulb | 1.0 | | | | |
| Mixed diet | 2.0 | 16.0 | 15.0 | 13.0 | 12.0 |
| Roasted soybean flour | — | 0.6 | 0.6 | 0.6 | 0.6 |
| Total Components | 19.0 | 37.6 | 36.6 | 35.6 | 34.6 |
| Dry matter intake (kg) | 13.1 | 24.3 | 23.4 | 22.5 | 21.6 |

TABLE 3-continued

Diet composition

| | Amount of diet (kg/day) | | | | |
|---|---|---|---|---|---|
| | Non-lactation | Lactation (Milk production: kg/day) | | | |
| Material | (Dry period) | 40 | 30 | 25 | 20 |
| Dry matter intake/body wt. (%) | 2.01 | 3.73 | 3.60 | 3.46 | 3.32 |
| TDN (% of DM) | 62.0 | 74.2 | 73.9 | 72.5 | 72.1 |
| CP (% of DM) | 9.6 | 17.0 | 16.9 | 16.6 | 16.5 |
| CF (% of DM) | 29.9 | 14.4 | 14.7 | 16.1 | 16.6 |
| Ca (% of DM) | 0.46 | 0.80 | 0.80 | 0.78 | 0.78 |
| P (% of DM) | 0.30 | 0.54 | 0.53 | 0.49 | 0.48 |
| Roughage/concentrate ratio | 80:20 | 40:60 | 41:59 | 47:53 | 49:51 |

TABLE 4

Composition of mixed diet

| Material | % |
|---|---|
| Corn | 55.0 |
| Soybean meal | 10.9 |
| Beet pulp | 15.0 |
| Corn gluten meal | 5.8 |
| Rice bran | 4.2 |
| Wheat bran | 2.6 |
| Rapeseed meal | 1.6 |
| Dicalcium phosphate | 2.23 |
| Calcium carbonate | 0.59 |
| NaCl | 1.08 |
| Vitamin/mineral mix | 1.00 |
| Total | 100.00 |
| CP (% of DM) | 19.17 |
| CF (% of DM) | 5.37 |
| TDN (% of DM) | 82.82 |

The mineral mix had the following mineral contents: 30 g/kg of Mg, 149 g/kg of K, 1.65 g/kg of Cu, 8.60 g/kg of Zn, 4.17 g/kg of Mn and 0.16 g/kg of I. The vitamin mix contained 50,000 IU of vitamin A, 5,000 IU of vitamin $D_3$ and 30 mg of dl-α-tocopherol acetate per gram of the mix.

TABLE 5

Results obtained when the milk production was
40 kg/day (5th week to 12th week)
Body wt.: 650 kg, milk production: 40 kg/day, milk protein: 3.0%

|  | Val | Cys | Met | Ile | Leu |
|---|---|---|---|---|---|
| Amino acid content (g/) | 87.05 | 13.69 | 28.93 | 73.2 | 158.47 |
| +RPMet: 6.4 g |  |  | 35.3 |  |  |
| +RPLys: 15.9 g |  |  |  |  |  |
| Requirement (g/day) | 80.6 |  | 33.6 | 68.1 | 122.4 |
| Sufficiency (%) for requirement | 108.0 |  | 86.1 | 107.5 | 129.5 |
| RPAA supplemented |  |  | 105.1 |  |  |

|  | Phe | Lys | His | Arg | Thr |
|---|---|---|---|---|---|
| Amino acid content (g/) | 81.68 | 88.70 | 34.35 | 77.13 | 73.60 |
| +RPMet: 6.4 g |  |  |  |  |  |
| +RPLys: 15.9 g |  | 104.6 |  |  |  |
| Requirement (g/day) | 60.2 | 104.7 | 34.9 | 44.2 | 53.0 |
| Sufficiency (%) for requirement | 135.7 | 84.7 | 98.4 | 174.5 | 138.9 |
| RPAA supplemented |  | 99.9 |  |  |  |

TABLE 6

Results obtained when the milk production was
40 kg/day (13th week to 24th week)
Body wt.: 650 kg, milk production: 40 kg/day, milk protein: 3.0%

|  | Val | Cys | Met | Ile | Leu |
|---|---|---|---|---|---|
| Amino acid content (g/) | 89.08 | 13.78 | 29.57 | 74.9 | 160.67 |
| +RPMet: 6.4 g |  |  | 36.0 |  |  |
| +RPLys: 15.9 g |  |  |  |  |  |
| Requirement (g/day) | 80.6 |  | 33.6 | 68.1 | 122.4 |
| Sufficiency (%) for requirement | 110.5 |  | 88.0 | 110.0 | 131.3 |
| RPAA supplemented |  |  | 107.1 |  |  |

|  | Phe | Lys | His | Arg | Thr |
|---|---|---|---|---|---|
| Amino acid content (g/) | 83.28 | 91.13 | 34.93 | 78.71 | 75.50 |
| +RPMet: 6.4 g |  |  |  |  |  |
| +RPLys: 15.9 g |  | 107.0 |  |  |  |
| Requirement (/day) | 60.2 | 104.7 | 34.9 | 44.2 | 53.00 |
| Sufficiency (%) for requirement | 138.3 | 87.0 | 100.0 | 178.1 | 142.5 |
| RPAA supplemented |  | 102.2 |  |  |  |

TABLE 7

Results obtained when the milk production was 30 kg/day
Body wt.: 650 kg, milk production: 30 kg/day, milk protein: 3.0%

|  | Val | Cys | Met | Ile | Leu |
|---|---|---|---|---|---|
| Amino acid content (g/) | 73.56 | 12.98 | 27.66 | 70.3 | 151.18 |
| +RPMet: 6.4 g |  |  | 34.06 |  |  |
| +RPLys: 15.9 g |  |  |  |  |  |
| Requirement (g/day) | 60.4 | 9.1 | 25.8 | 52.2 | 93.3 |
| Sufficiency (%) for Requirement | 136.1 | 142.6 | 107.2 | 134.7 | 162.0 |
| RPAA supplemented |  |  | 132.0 |  |  |

|  | Phe | Lys | His | Arg | Thr |
|---|---|---|---|---|---|
| Amino acid content (g/) | 78.22 | 85.40 | 32.83 | 73.90 | 70.68 |
| +RPMet: 6.4 g |  |  |  |  |  |
| +RPLYs: 15.9 g |  | 101.3 |  |  |  |
| Requirement (g/day) | 46.1 | 80.4 | 26.8 | 34.6 | 40.7 |
| Sufficiency (%) for Requirement | 169.7 | 106.2 | 122.5 | 213.6 | 173.7 |
| RPAA supplemented |  | 126.0 |  |  |  |

TABLE 8

Results obtained when the milk production was 25 kg/day
Body wt.: 650 kg, milk production: 25 kg/day, milk protein: 3.5%

|  | Val | Cys | Met | Ile | Leu |
|---|---|---|---|---|---|
| Amino acid content (g/) | 73.97 | 11.71 | 24.18 | 62.2 | 133.50 |
| +RPMet: 6.4 g |  |  | 30.58 |  |  |
| +RPLys: 15.9 g |  |  |  |  |  |
| Requirement (g/day) | 59.8 | 8.9 | 25.2 | 50.9 | 90.9 |
| Sufficiency (%) for Requirement | 123.7 | 131.6 | 95.9 | 122.1 | 146.9 |
| RPAA supplemented |  |  | 121.3 |  |  |

|  | Phe | Lys | His | Arg | Thr |
|---|---|---|---|---|---|
| Amino acid content (g/) | 69.58 | 75.18 | 29.11 | 65.56 | 62.11 |
| +RPMet: 6.4 g |  |  |  |  |  |
| +RPLys: 15.9 g |  | 91.0 |  |  |  |
| Requirement (g/day) | 44.9 | 78.4 | 26.1 | 33.8 | 39.7 |
| Sufficiency (%) for Requirement | 155.0 | 95.9 | 111.5 | 194.0 | 156.5 |
| RPAA supplemented |  | 116.1 |  |  |  |

(3) Quantitative determination of milk:

The milk production of each dairy cow was determined at the time of milking every morning and evening, and the milk production on that day was given in terms of the total of milk productions in the morning and evening (kg/day). Further, the average milk production of each cow in seven days was also determined and given as the average milk production of the week. The average of the average milk productions of respective five cows in the week was calculated in both control group and the RPAA group. The total milk production of each dairy cow and the average total milk production of each group were calculated. The milk production was measured with Alpharaval milk meter Mark 4 (a product of Nagase Sangyo).

(4) Results:

1) Change in average milk production per week (measured):

The average milk production per week of the five cows in each group reached the peak 5 to 6 weeks after calving and then gradually reduced day by day. The milk production peak was 42.9 kg/day in the control group and 43.6 kg/day in the RPAA group. The peaks in both groups were sufficiently high for the high-yielding dairy cows.

The average milk production per week gradually decreased after the peak in both groups. During the period before the peak (early period), the milk production in the RPAA group was higher than that in the control group. The milk production sharply decreased by summer heat in both groups. It recovered in the 23rd week to keep milk production of 30 kg/day continuously for 7 weeks until the 29th week, which was superior to that in the control group. In the late period (40th week and thereafter), the inhibition of reduction in the milk production was observed.

2) Total milk production (measured):

Table 9 shows the average total milk production, its standard deviation (measured) and administration effect (improvement rate and unit) in each group in the lactation period.

The administration effect (improvement rate) was increased with time during the test period. Namely, it was 2.5%, 3.7% and 4.2% in the early, middle and late periods, respectively. In the RPAA group, the deviation was extremely small, and the average milk production of the five cows was 8,500 kg.

3) Total milk production (adjust with milk production during covariant period);

Table 10 shows the milk production adjusted with the milk production during covariant period. The administration effect (improvement rate) was 4.6%, 4.6% and 6.2% in the early, middle and late periods, respectively. In the whole period (from the 6th to 44th week), the improvement rate was 5.0%. The improvement rate was increased by the adjustment of covariant.

(5) Milk production estimated from WOOD lactation curve:

Table 11 shows the milk production (in the period of 305 days after calving) estimated from WOOD lactation curve. The estimated average milk production in this test was 9502.5 kg in the control group and 9845.2 kg in the RPAA group. This level was very high even for the high-yielding dairy cows. The milk production was higher than that obtained in previous lactation by 14.7% in the control group and by 24.0% in the RPAA group. The improvement in the RPAA group was thus higher than that in the control group. As for the estimated average milk production in 305 days adjusted with the milk production in previous lactation, the improvement was 5.1%, which was substantially equal to the adjusted improvement (5.0%) of the total milk production during the experimental period.

TABLE 9

Total milk production (Actual)

| Lactation | Average (standard deviation) | | Effect (improvement) | |
|---|---|---|---|---|
| | Control kg/cow | RPAA group kg/cow | Amount (rate) kg/cow (%) | Unit kg/AAkg |
| Early period (6th to 17th week) | 3187.4 | 3266.9 | 79.5(2.5) | 36.0 |
| 12 weeks (84 days) AA; 2.21 kg/cow** | (281.0) | (153.6) | | |
| Middle period (18th to 31st week) | 2846.0 | 2949.9 | 103.9(3.7) | 40.3 |
| 14 weeks (98 days) AA; 2.58 kg/cow | (300.0) | (79.7) | | |
| Late period (32nd to 44th week) | 2210.1 | 2301.7 | 91.6(4.2) | 37.7 |
| 13 weeks (92 days) AA; 2.43 kg/cow | (313.3) | (106.9) | | |
| Early to middle period (6th to 31st week) | 6033.3 | 6216.8 | 183.5(3.0) | 38.3 |
| 26 weeks (182 days) AA; 4.79 kg/cow | (554.8) | (124.3) | | |
| Middle to late period (18th to 44th week) | 5056.0 | 5251.6 | 195.6(3.9) | 39.0 |
| 27 weeks (189 days) AA; 5.01 kg | (584.1) | (147.6) | | |
| Whole period (6th to 44th week) | 8243.4 | 8518.5 | 275.1(3.3) | 38.1 |
| 39 weeks (273 days) AA; 7.22 kg/cow | (793.7) | (87.9) | | |

**Initiation of giving the mixed feed of the present invention: in the sixth week aftep calving
Dose: 26.2 g/cow/day (Lys: 15.7 g, Met: 6.4 g)

TABLE 10

Total milk production (the average adjust with milk production during covariant period***)

| Lactation | Average (standard deviation) | | Effect (improvement) | |
|---|---|---|---|---|
| | Control kg/cow | RPAA group kg/cow | Amount (rate) kg/cow (%) | Unit kg/AAkg |
| Early period (6th to 17th week) | 3155.3 | 3299.0 | 143.7(4.6) | 65.0 |
| 12 weeks (84 days) AA; 2.21 kg/cow** | (254.0) | (118.8) | | |
| Middle period (18th to 31st week) | 2832.4 | 2963.4 | 131.0(4.6) | 50.8 |
| 14 weeks (98 days) AA; 2.58 kg/cow | (280.3) | (116.5) | | |
| Late period (32nd to 44th week) | 2188.1 | 2323.7 | 135.6(6.2) | |
| 13 weeks (92 days) AA; 2.43 kg/cow | (273.6) | (153.3) | | |
| Early to Middle period (6th to 31st week) | 5987.7 | 6262.4 | 274.7(4.6) | 57.4 |
| 26 weeks (182 days) AA; 4.79 kg/cow | (498.7) | (162.2) | | |
| Middle to Late period (18th to 44th week) | 5020.5 | 5287.1 | 266.6(5.3) | 53.2 |
| 27 weeks (189 days) AA; 5.01 kg | (520.7) | (245.3) | | |

TABLE 10-continued

Total milk production (the average adjust with milk production during covariant period***)

| Lactation | Average (standard deviation) | | Effect (improvement) | |
|---|---|---|---|---|
| | Control kg/cow | RPAA group kg/cow | Amount (rate) kg/cow (%) | Unit kg/AAkg |
| Whole period (6th to 44th week) 39 weeks (273 days) AA; 7.22 kg/cow | 8175.8 (686.2) | 8586.1 (246.8) | 410.3(5.0) | 56.8 |

**Initiation of giving the mixed feed of the present invention: in the sixth week after delivery
Dose: 26.2 g/cow/day (Lys: 15.7 g, Met: 6.4 g)
***Milk production of previous lactation (305 days) estimated from Wood lactation curve:
control group: (8291.8 ± 539.1)
RPAA group: (7971.4 ± 552.8)

TABLE 11

Milk production in 305 days estimated from WOOD lactation curve

| No. | Previous lactation (kg) | Test of the invention (kg) | Increase (kg) | Rate of increase (%) | Adjusted value (kg) |
|---|---|---|---|---|---|
| Control group | | | | | |
| C-1 | 8343.4 | 10619.2 | 2275.8 | 27.3 | 10529.4 |
| C-2 | 8103.0 | 9384.4 | 1281.4 | 15.8 | 9396.5 |
| C-3 | 7660.8 | 8394.8 | 734.0 | 9.6 | 8594.3 |
| C-4 | 8211.7 | 9396.0 | 1184.3 | 14.4 | 9362.1 |
| C-5 | 9140.1 | 9718.0 | 577.9 | 6.3 | 9290.7 |
| Average | 8291.8 | 9502.5 | 1210.7 | 14.7 | 9434.6 |
| S.D. | 539.1 | 797.7 | 664.8 | 8.0 | 695.0 |
| RPAA group | | | | | |
| E-1 | 7885.7 | 10023.3 | 2137.6 | 27.1 | 10127.5 |
| E-2 | 7469.6 | 9650.8 | 2181.2 | 29.2 | 9931.3 |
| E-3 | 8618.6 | 9773.8 | 1155.2 | 13.4 | 9567.4 |
| E-4 | 7420.7 | 9882.6 | 2461.9 | 33.2 | 10183.8 |
| E-5 | 8462.2 | 9895.7 | 1433.5 | 16.9 | 9755.6 |
| Average | 7971.4 | 9845.2 | 1873.9 | 24.0 | 9913.1 |
| S.D. | 552.8 | 140.1 | 552.3 | 8.4 | 256.8 |
| Difference between RPAA group and control group | | 342.7 kg | | | 478.5 kg |
| Impovement rate | | 3.6% | | | 5.1% |

Table 12 shows the results obtained as described above in comparison with those of Rogers method described in Journal of Dairy Science, Vol. 72, No. 7 (1989) and given in the column of the prior art in the Table.

TABLE 12

| | Present invention | Results of Rogers method | |
|---|---|---|---|
| | Dairy cow | | |
| | High-yielding cow | High-yielding cow Test location | Low-yielding cow |
| Test location | Japan (Tochigi) (control) | Virginia Univ. Illinois Univ. | Cornell Univ. |
| Corn feed | ○ (○) | ○ | ○ |
| RPAA | ○ (—) | ○ | ○ |
| Appetizer | ○ (○) | — | — |
| Soybean | ○ (○) | ○ | — |
| Urea | — (—) | — | ○ |
| Corn gluten | ○ (○) | — | ○ |
| Dry matter intake (kg/day)(control) | | | |
| Early period (milk production: 40 kg/day) | 24.3(24) | 21.3 | 19.7 |
| Middle period milk production: 30 kg/day) | 23.4(23) | 20.5 | 18.9 |
| Late period (milk production: 25 kg/day) | 22.5(22) | | |
| Whole period | | 20.5 | 19.0 |
| RPLyS/RPMet intake (g/day) | (control) | | |
| Early period (milk production: 40 kg/day) | 15.8/6.4 | — | 23.0/8.6 | 18.8/6.9 |
| Middle period milk production: 30 kg/day) | 15.8/6.4 | — | 18.1/6.8 | 15.3/5.6 |
| Late period (milk production (25 kg/day) | 15.8/6.4 | — | — | — |
| Whole period | 15.8/6.4 | — | 18.3/6.8 | 15.4/5.7 |
| WOOD adjusted value | | Virginia Univ. | Illinois Univ. | Cornell Univ. |
| Milk production | | | | |
| (kg/305 days) | 9913 | 8492 | 8744 | 7578 |
| (Control) | (9434) | (9037) | (9035) | (7375) |
| Increase (%) | 5.1 | — | — | 3.0 |

○ in the Table indicates that the corresponding component was used.

o in the Table indicates that the corresponding component was used.

The early period indicates 36 to 119 days after calving, the middle period indicates 120 to 217 days after calving, and the late period indicates 218 to 308 days after calving in the present invention, while in the experiment of Rogers, the early, middle and whole periods indicate 22 to 112 days, 113 to 224 days and 22 to 305 days, respectively, after calving.

In the experiment of Rogers, the ratio of Lys/Met of 21.7/7.8 is the closest to the amount and ratio of the present invention and, therefore, this value was employed as comparative intake of the diet and comparative milk production.

It is apparent from the results given in the Table that the milk production of the high-yielding dairy cows was not increased, though that of the low-yielding dairy cows was increased by 3.0% in the experiment of Rogers. On the contrary, in the present invention, the milk production of even the high-yielding dairy cows could be increased by as much as 5.1%.

Figure 1A:
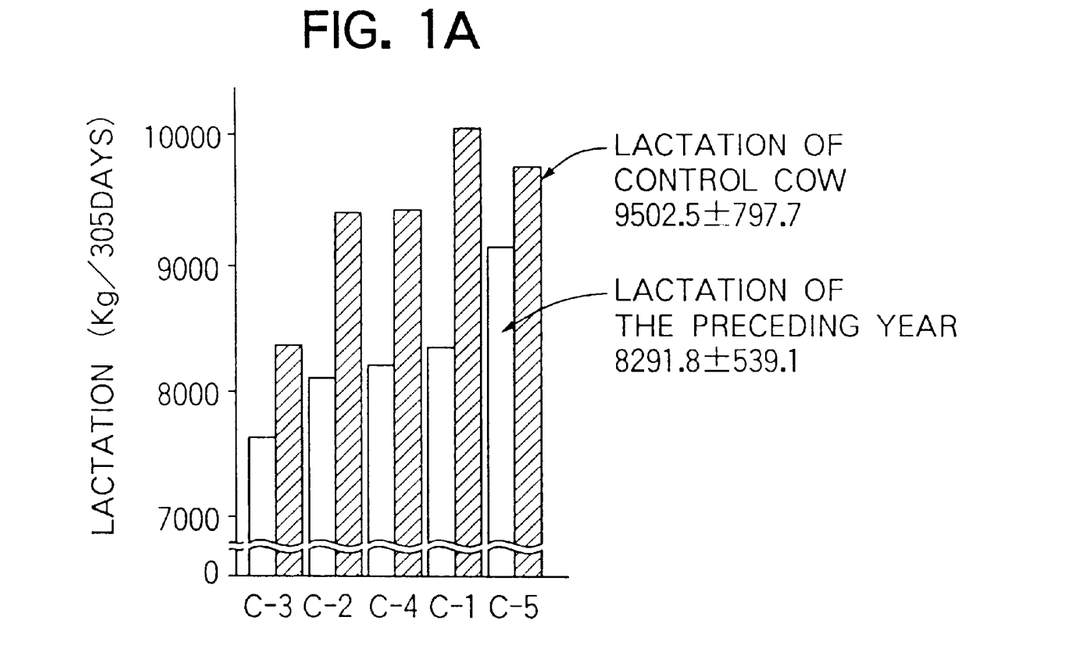
FIGS. 1(A) and 1(B) show the lactation (milk production) of each control cow (A) and each RPAA cow (B) fed by the method of the present invention, as determined from Wood lactation curves as compared with that of the preceding year.
Figure 1B:
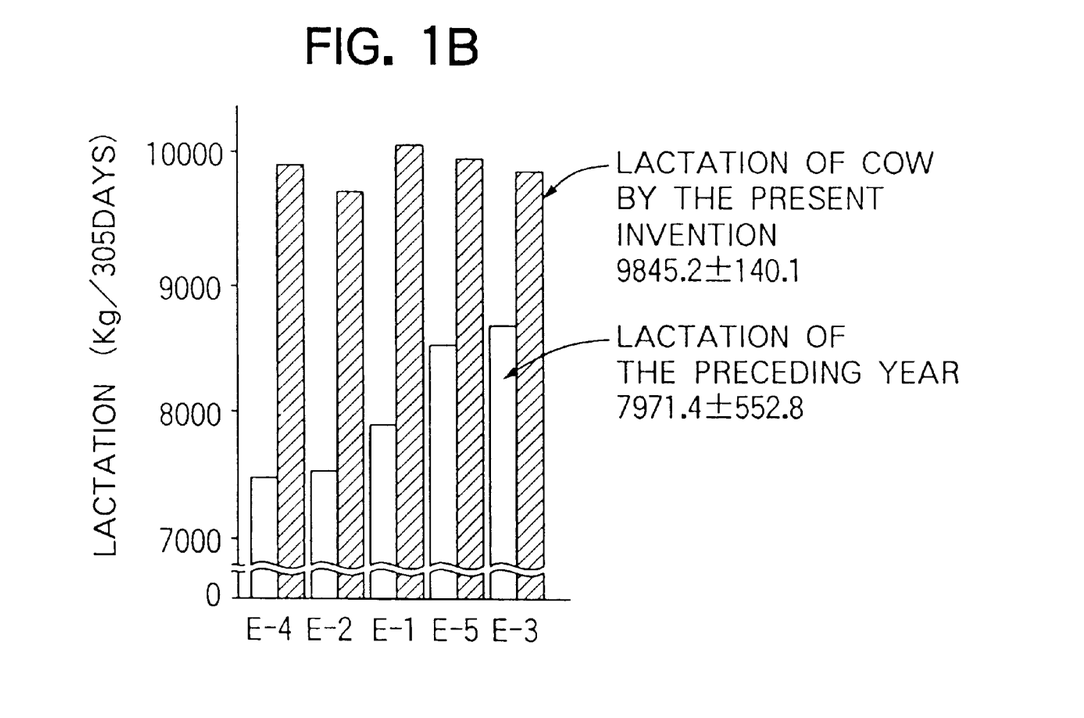

The lactation (milk production) of each cow determined from Wood lactation curve in Example 1 is shown in FIG. 1 in comparison with that of the preceding year. In control (A) in FIG. 1, the lactation of the low-yielding cows was still low, though the total lactation was increased. However, in the present invention (B), the increase in the lactation of the low-yielding cows was remarkable and the lactation of each of the five cows was substantially equal.

What is claimed is:

1. A corn-based mixed diet which comprises rumen-protected lysine, rumen-protected methionine, corn, and an appetizer preferred by dairy cows and which is rice brans; wherein said appetizer is present in an amount of 0.3 to 4% by weight based on the whole diet.

2. The corn-based mixed diet according to claim 1 wherein the corn is selected from the group consisting of corn silage and corn grains.

3. The corn-based mixed diet according to claim 2 wherein the corn is in an amount of 30 to 70% by weight based on the whole diet.

4. The corn-based mixed diet according to claim 1 wherein an amount of the rumen-protected lysine and rumen-protected methionine is in the range of 0.01 to 1% by weight based on the whole mixed diet.

5. The corn-based mixed diet according to claim 4 wherein a weight ratio of the lysine to the methionine is in the range of 5/1 to 1/1.

6. The corn-based mixed diet as claimed in claim 1 wherein said corn-based mixed diet is free of fishmeal and bloodmeal.

7. The corn-based mixed diet as claimed in claim 1, consisting of said rumen-protected lysine, said rumen-protected methionine, said corn, and said appetizer.

8. A method for stably producing a high yield of milk which comprises the step of feeding to dairy cows in the course of their lactation period either diet (1) a corn-based mixed diet containing rumen-protected lysine, rumen-protected methionine, an appetizer preferred by dairy cows and corn or diet (2) rumen-protected lysine, rumen-protected methionine and corn, an appetizer being contained in at least one member selected from the group consisting of the rumen-protected lysine, rumen-protected inethionine and corn in diet (2), wherein the appetizer in both diets (1) and (2) is rice brans; wherein said appetizer is present in an amount of 0.3 to 4% by weight based on the whole diet.

9. The method according to claim 8 wherein the corn is selected from the group consisting of corn silage and corn grains.

10. The method according to claim 9 wherein the corn is in an amount of 30 to 70% by weight based on the whole diet.

11. The method according to claim 8 wherein an amount of the rumen-protected lysine and rumen-protected methionine is in the range of 0.01 to 1% by weight based on the whole mixed diet.

12. The method according to claim 11 wherein a weight ratio of the lysine to the methionine is in the range of 5/1 to 1/1.

13. The method according to claim 8 wherein the feeding is conducted every day beginnig about 3 weeks prior to the parturition of the dairy cows and continuing the feeding until 308 days after the parturition.

14. The method as claimed in claim 8 wherein both diet (1) and diet (2) are free of fishmeal and bloodmeal.

* * * * *

UNITED STATES PATENT AND TRADEMARK OFFICE
CERTIFICATE OF CORRECTION

PATENT NO. : 5,906,842

DATED : May 25, 1999

INVENTOR(S) : Hiroyuki Sato, et al.

It is certified that error appears in the above-identified patent and that said Letters Patent is hereby corrected as shown below:

Column 14, line 60, after "cows" delete "and".

Signed and Sealed this

Fourteenth Day of September, 1999

Attest:

Q. TODD DICKINSON

Attesting Officer     Acting Commissioner of Patents and Trademarks